US006925418B2

(12) United States Patent
Fujiyama et al.

(10) Patent No.: US 6,925,418 B2
(45) Date of Patent: Aug. 2, 2005

(54) PLANT MAINTENANCE METHOD AND APPARATUS

(75) Inventors: Kazunari Fujiyama, Kanagawa-ken (JP); Toshihiro Fujiwara, Kanagawa-ken (JP); Kazuhiro Saito, Kanagawa-ken (JP); Taiji Hirawawa, Kanagawa-ken (JP); Satoshi Nagai, Kanagawa-ken (JP); Hitoshi Kichise, Kanagawa-ken (JP); Mitsuyoshi Okazaki, Saitama-ken (JP); Hirotsugu Kodama, Tokyo-to (JP); Seiichi Asatsu, Kanagawa-ken (JP); Masanori Minowa, Tokyo-to (JP); Takayuki Iwahashi, Kanagawa-ken (JP); Shigeru Harada, Tokyo-to (JP); Mamoru Sudo, Kanagawa-ken (JP); Fumiharu Ishii, Tokyo-to (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/409,277

(22) Filed: Apr. 9, 2003

(65) Prior Publication Data

US 2003/0191605 A1 Oct. 9, 2003

(30) Foreign Application Priority Data

Apr. 9, 2002 (JP) ........................................ 2002-106666

(51) Int. Cl.⁷ ............................ G06F 11/30; G06F 15/00
(52) U.S. Cl. ........................ 702/184; 702/182; 702/185
(58) Field of Search ................................. 702/183, 186, 702/35, 182, 185, 187, 188; 376/215–217; 700/83, 96, 109

(56) References Cited

U.S. PATENT DOCUMENTS

| 5,311,562 | A | 5/1994 | Palusamy et al. |
| 5,648,919 | A | 7/1997 | Yamauchi et al. |
| 5,970,437 | A | 10/1999 | Gorman et al. |
| 6,505,145 | B1 * | 1/2003 | Bjornson ..................... 702/185 |
| 6,618,692 | B2 * | 9/2003 | Takahashi et al. .......... 702/188 |

OTHER PUBLICATIONS

U.S. Appl. No. 10/409,278, filed Apr. 9, 2003, Fujiyama et al.

* cited by examiner

*Primary Examiner*—Bryan Bui
(74) *Attorney, Agent, or Firm*—Foley & Lardner LLP (57) ABSTRACT

An apparatus for maintaining plant equipment incorporates an input unit to receive information on targets and ranges of plant equipment to be maintained and a failure-event tree breakdown unit to perform tree-breakdown on failures to be expected from events to be inspected. A failure-unreliability function calculation unit calculates unreliability of each item in failure-event tree breakdown and a failure-derived monetary loss calculation unit multiplies each unreliability and a cost of recovery from each event in accordance with the failure-event tree breakdown. A preventive maintenance expense calculation unit calculates preventive maintenance expenses for preventing failure events and a maintenance decision-making unit decides maintenance timing and technique through comparison between the recovery cost and the preventive maintenance expense.

23 Claims, 11 Drawing Sheets

| CAUSAL EVENT \ RESULTANT EVENT | CREEP DEFORMATION OF NOZZLE DIAPHRAGM | CONTACT BETWEEN NOZZLE AND MOVING-BLADE OR ROTOR WHEEL | INCREASE IN STEAM-PASSAGE GAPS | INTERNAL EFFICIENCY DECREASE | MOVING-BLADE CRACK | MOVING-BLADE SCATTERING | NOZZLE FAILURE | ROTOR WHEEL CRACK | ROTOR FAILURE |
|---|---|---|---|---|---|---|---|---|---|
| CREEP DEFORMATION OF NOZZLE DIAPHRAGM | F1 | F12 | F13 | F14 | F15 | F16 | F17 | F18 | F19 |
| CONTACT BETWEEN NOZZLE AND MOVING-BLADE OR ROTOR WHEEL | – | F2 | F23 | F24 | F25 | F26 | F27 | F28 | F29 |
| INCREASE IN STEAM-PASSAGE GAPS | – | – | F3 | F34 | – | – | – | – | – |
| INTERNAL EFFICIENCY DECREASE | – | – | – | F4 | – | – | – | – | – |
| MOVING-BLADE CRACK | – | – | – | – | F5 | F56 | – | F57 | F4 |
| MOVING-BLADE SCATTERING | – | – | – | – | – | F6 | F67 | F68 | F69 |
| NOZZLE FAILURE | – | – | – | – | – | F76 | F7 | F78 | F79 |
| ROTOR WHEEL CRACK | – | – | – | – | F85 | F4 | – | F8 | F89 |
| ROTOR FAILURE | – | – | – | – | – | F96 | F97 | – | F9 |

| ITEM | RECOVERY COST |
|---|---|
| CREEP DEFORMATION OF NOZZLE DIAPHRAGM | C1 |
| CONTACT BETWEEN NOZZLE AND MOVING-BLADE OR ROTOR WHEEL | C2 |
| INCREASE IN STEAM-PASSAGE GAPS | C3 |
| INTERNAL EFFICIENCY DECREASE | C4 |
| MOVING-BLADE CRACK | C5 |
| MOVING-BLADE SCATTERING | C6 |
| NOZZLE FAILURE | C7 |
| ROTOR WHEEL CRACK | C8 |
| ROTOR FAILURE | C9 |

| CAUSAL EVENT \ RESULTANT EVENT | BOILER SCALE DETACHMENT | EROSION/ DAMAGE OF STRAINER | EROSION OF MAIN STEAM BYPASS VALVE | EROSION OF FIRST-STAGE NOZZLE BLADE | CHANGE IN NOZZLE-THROAT AREA | INTERNAL EFFICIENCY DECREASE | EROSION OF MOVING-BLADE/ SHROUD/ TENON | VIBRATION/ FATIGUE OF MOVING-BLADE | MOVING-BLADE FAILURE | NOZZLE FAILURE | ROTOR SLOT FATIGUE | ROTOR FAILURE |
|---|---|---|---|---|---|---|---|---|---|---|---|---|
| BOILER SCALE DETACHMENT | F01 | F0102 | F0103 | F0104 | F0105 | F0106 | F0107 | F0108 | F0109 | F0110 | F0111 | F0112 |
| EROSION/ DAMAGE OF STRAINER | – | F02 | F0203 | F0204 | F0205 | F0206 | F0207 | F0208 | F0209 | F0210 | F0211 | F0212 |
| EROSION OF MAIN STEAM BYPASS VALVE | – | – | F03 | F0304 | – | – | – | – | – | – | – | – |
| EROSION OF FIRST-STAGE NOZZLE BLADE | – | – | – | F04 | F0405 | F0406 | F0407 | F0408 | F0409 | F0410 | F0411 | F0412 |
| CHANGE IN NOZZLE-THROAT AREA | – | – | – | – | F05 | F0506 | F0507 | F0508 | F0509 | F0510 | F0511 | F0512 |
| INTERNAL EFFICIENCY DECREASE | – | – | – | – | – | F06 | – | – | – | – | – | – |
| EROSION OF MOVING-BLADE/ SHROUD/ TENON | – | – | – | – | – | – | F07 | F0708 | F0709 | F0710 | F0711 | F0712 |
| VIBRATION/ FATIGUE OF MOVING-BLADE | – | – | – | – | – | – | – | F08 | F0809 | F0810 | F0811 | F0812 |
| MOVING-BLADE FAILURE | – | – | – | – | – | – | – | – | F09 | F0910 | F0911 | F0912 |
| NOZZLE FAILURE | – | – | – | – | – | – | – | – | F0119 | F10 | F0111 | F0112 |
| ROTOR SLOT FATIGUE | – | – | – | – | – | – | – | F0118 | F0119 | – | F11 | F1112 |
| ROTOR FAILURE | – | – | – | – | – | – | – | – | F0129 | F1120 | – | F12 |

FIG. 10

| ITEM | RECOVERY COST |
|---|---|
| BOILER SCALE DETACHMENT | CO1 |
| EROSION/ DAMAGE OF STRAINER | CO2 |
| EROSION OF MAIN STEAM BYPASS VALVE | CO3 |
| EROSION OF FIRST-STAGE NOZZLE BLADE | CO4 |
| CHANGE IN NOZZLE-THROAT AREA | CO5 |
| INTERNAL EFFICIENCY DECREASE | CO6 |
| EROSION OF MOVING-BLADE/ SHROUD/ TENON | CO7 |
| VIBRATION/ FATIGUE OF MOVING-BLADE | CO8 |
| MOVING-BLADE FAILURE | CO9 |
| NOZZLE FAILURE | C10 |
| ROTOR SLOT FATIGUE | C11 |
| ROTOR FAILURE | C12 |

| RESULTANT EVENT / CAUSAL EVENT | TURBINE SHAFT VIBRATION | MOVING-BLADE FAILURE | NOZZLE FAILURE | ROTOR SLOT FATIGUE | ROTOR FAILURE | INTERNAL EFFICIENCY DECREASE |
|---|---|---|---|---|---|---|
| TURBINE SHAFT VIBRATION | F01 | F0102 | F0103 | F0104 | F0105 | F0106 |
| MOVING-BLADE FAILURE | - | F02 | F0203 | F0204 | F0205 | F0206 |
| NOZZLE BREAKAGE | - | - | F03 | F0304 | F0305 | F0306 |
| ROTOR SLOT FATIGUE | - | - | - | F04 | F0405 | F0406 |
| ROTOR FAILURE | - | - | - | - | F05 | F0506 |
| INTERNAL EFFICIENCY DECREASE | - | - | - | - | - | F06 |

PLANT MAINTENANCE METHOD AND APPARATUS

CROSS REFERENCE TO RELATED APPLICATION

This application is based upon and claims the benefit of priority from the prior Japanese Patent Application No. 2002-106666, filed on Apr. 9, 2002, the entire contents of which are incorporated herein by reference.

BACKGROUND OF THE INVENTION

The present invention relates to plant-maintenance apparatus and method for maintaining plant equipment such as steam turbines for thermal power plants.

Increase in the number of plants such as thermal power plants used for long years has demanded maintenance at low cost but with no failures. Risk-based maintenance (RBM) has been recently introduced as one of the solutions to match the demands. A known RBM is to decide maintenance priority allocations based ranking in the order of combinations of classified plant-equipment failure rates and consequence of failure, such as, disclosed by Kihara et el., in Piping Technology, pages 76 to 79, issued in December, 2000.

Classification of consequence of failure, however, requires experimental qualitative decision making, and hence has several drawbacks, for example, it does not necessarily involve quantitative evaluation.

SUMMARY OF THE INVENTION

With the foregoing as background, it is an object of the present invention to provide a method and an apparatus for objectively and quantitatively deciding the optimum maintenance timing by risk-based cost estimation with extracted information on plant-equipment failures and expected events due to the failures or on-line monitoring of the least number of failure-related inspection items.

To achieve the objectives, according the first aspect of the present invention, an apparatus for maintaining plant equipment is provided, the apparatus including: an input unit configured to receive information on targets and ranges of plant equipment to be maintained, that constitute a plant, inspection information and operation-history information; a failure-event tree breakdown unit configured to perform tree-breakdown on failures to be expected from a failure-events to be inspected, in order to obtain a failure-event tree; a failure-unreliability function calculation unit configured to calculate unreliability of a resultant event in the failure-event tree with respect to a causal event in the failure-event tree preceding the resultant event (i.e., unreliability between each item in the failure-event tree); a failure-derived monetary loss calculation unit configured to multiply each unreliability and a cost of recovery from each event to be inspected and accumulate results of multiplication in accordance with the failure-event tree breakdown, thus obtaining a recovery cost; a preventive-maintenance expense calculation unit configured to calculate preventive maintenance expenses for preventing failure events; and a maintenance decision-making unit configured to decide maintenance timing and technique through comparison between the recovery cost and the preventive maintenance expenses.

The present invention further provides an apparatus for maintaining plant equipment, which includes: an input unit configured to receive information on targets and ranges of plant equipment to be maintained, that constitute a plant, inspection information and operation-history information; an inspection-priority item selection unit configured to select a priority item, which relates to a failure event in a failure-event tree and is stored in a failure-event tree database, as items to be inspected; an inspection unit configured to inspect the selected items; a failure-event tree breakdown unit configured to perform tree-breakdown on failures to be expected from a failure-events to be inspected, in order to obtain a failure-event tree; a failure-unreliability function calculation unit configured to calculate unreliability of a resultant event in the failure-event tree with respect to a causal event in the failure-event tree preceding the resultant event; a failure-derived monetary loss calculation unit configured to multiply each unreliability and a cost of recovery from each event to be inspected and accumulate results of multiplication in accordance with the failure-event tree breakdown, thus obtaining a recovery cost; a preventive-maintenance expense calculation unit configured to calculate preventive maintenance expenses for preventing failure events; and a maintenance decision-making unit configured to decide maintenance timing and technique through comparison between the recovery cost and the preventive maintenance expenses.

The present invention further provides an apparatus for maintaining plant equipment, which includes: an input unit configured to receive information on targets and ranges of plant equipment to be maintained, that constitute a plant, inspection information and operation-history information; a monitoring-item selection unit configured to select a priority item, which relates to a failure event in a failure-event tree and is stored in a failure-event tree database, as items to be monitored; an on-line monitoring unit configured to monitor the selected items; a failure-event tree breakdown unit configured to perform tree-breakdown on failures to be expected from a failure-events to be inspected, in order to obtain a failure-event tree; a failure-unreliability function calculation unit configured to calculate unreliability of a resultant event in the failure-event tree with respect to a causal event in the failure-event tree preceding the resultant event; a failure-derived monetary loss calculation unit configured to multiply each unreliability and a cost of recovery from each event to be inspected and accumulate results of multiplication in accordance with the failure-event tree breakdown, thus obtaining a recovery cost; a preventive-maintenance expense calculation unit configured to calculate preventive maintenance expenses for preventing failure events; and a maintenance decision-making unit configured to decide maintenance timing and technique through comparison between the recovery cost and the preventive maintenance expenses.

The failure-event tree breakdown unit may be provided with a failure-event tree database constructed based on inspection histories and operation histories for the plant to be maintained and other plants; and the failure-event tree breakdown unit may be configured to perform the tree-breakdown from a specific failure-event of a specific part of the plant to be maintained inputted by an input unit, while referring to contents of the database.

The failure-unreliability function calculation unit may be provided with a failure-unreliability function database constructed based on inspection histories and operation histories for the plant to be maintained and other plants; and the failure-unreliability function calculation unit may be configured to calculate the unreliability while referring to the database based on failure-unreliability function between the resultant event and the causal event in the failure-event tree in accordance with information on parts of the plant and events inputted via the input unit.

The failure-event tree breakdown unit and the failure-unreliability function calculation unit may be configured to adjust the order of the failure events in the failure-event tree and failure-unreliability function.

The unreliability of the plant equipment may be given using cumulative hazard function based on an operation time at which each failure event occurs.

According to the second aspect of the present invention, a method of maintaining plant equipment is provided, the method including the steps of: receiving information on targets and ranges of plant equipment to be maintained, that constitute a plant, inspection information and operation-history information; performing tree-breakdown on failures to be expected from events to be inspected, thereby obtaining a failure-event tree; calculating unreliability of every resultant event in the failure-event tree with respect to corresponding causal event in the failure event tree; multiplying each unreliability and a cost of recovery from each event to be inspected and accumulating results of multiplication in accordance with the failure-event tree breakdown, thereby obtaining a recovery cost; calculating preventive maintenance expenses for preventing failure events; and deciding maintenance timing and technique through comparison between the recovery cost and the preventive maintenance expenses.

The present invention further provides a method of maintaining plant equipment, which includes the steps of: receiving information on plant equipment to be maintained, that constitute a plant, inspection information and operation-history information; selecting a priority item, which relates to a event in a failure-event tree and is stored in a failure-event tree database, as items to be inspected; inspecting the selected item; performing tree-breakdown on failures to be expected from events to be inspected, thereby obtaining a failure-event tree; calculating unreliability of every resultant event in the failure-event tree with respect to corresponding causal event in the failure event tree; multiplying each unreliability and a cost of recovery from each event to be inspected and accumulating results of multiplication in accordance with the failure-event tree breakdown, thereby obtaining a recovery cost; calculating preventive maintenance expenses for preventing failure events; and deciding maintenance timing and technique through comparison between the recovery cost and the preventive maintenance expenses.

The present invention further provides a method of maintaining plant equipment, which includes the steps of: receiving information on targets and ranges of plant equipment to be maintained, that constitute a plant, inspection information and operation-history information; selecting a priority item, which relates to a event in a failure-event tree and is stored in a failure-event tree database, as items to be monitored; monitoring the selected items; performing tree-breakdown on failures to be expected from events to be inspected; calculating unreliability of each item in the failure-event tree breakdown; multiplying each unreliability and a cost of recovery from each event to be inspected and accumulate results of multiplication in accordance with the failure-event tree breakdown, thus obtaining a recovery cost; calculating preventive maintenance expenses for preventing failure events; and deciding maintenance timing and technique through comparison between the recovery cost and the preventive maintenance expenses.

The present invention further provides a method of maintaining plant equipment, which includes the steps of: transmitting, over a network, data from inspection and monitoring units for equipment that constitute each of a plurality of plants, each plant having a plurality of units; processing the transmitted data through failure-event tree breakdown, failure-unreliability function calculation, failure-derived monetary loss calculation, failure-derived monetary loss calculation and preventive-maintenance expense calculation; and storing the processed data in a failure-event tree database and a failure-unreliability function database for learning, for accurate failure-unreliability function calculation in maintenance decision making; and transmitting results of maintenance decision making to the plants.

DETAILED DESCRIPTION OF THE EMBODIMENTS

Several embodiments according to the present invention will be disclosed with reference to the attached drawings.

Figure 1:
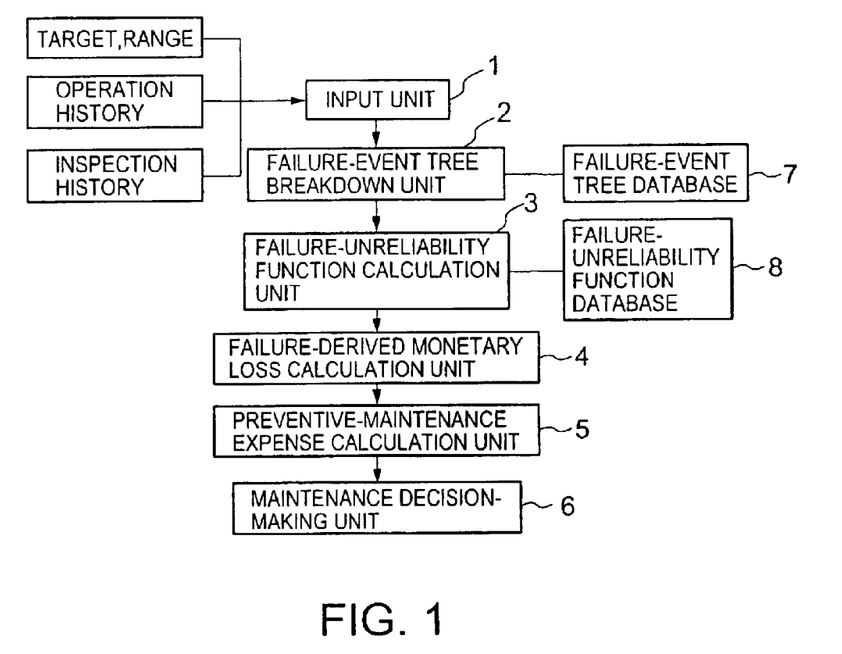
FIG. 1 shows a block diagram of a first embodiment according to the present invention.

FIG. 1 shows a block diagram of a first embodiment according to the present invention. A plant-maintenance apparatus incorporates an input unit 1, a failure-event tree breakdown (FETB) unit 2, a failure-unreliability function calculation (FUFC) unit 3, a failure-derived monetary loss calculation (FDMLC) unit 4, a preventive-maintenance expense calculation (PMEC) unit 5 and a maintenance decision-making (MDM) unit 6.

Entered via the input unit 1 are targets and ranges or a list of plant component parts to be maintained, an operation history such as operation hours and operation-startup/shutdown times and an inspection history including inspection data on failures, damage, degradations and their indications. Disclosed below are operations of the first embodiment for inspection of falling-down of a nozzle diaphragm of a steam-turbine.

Figure 2:
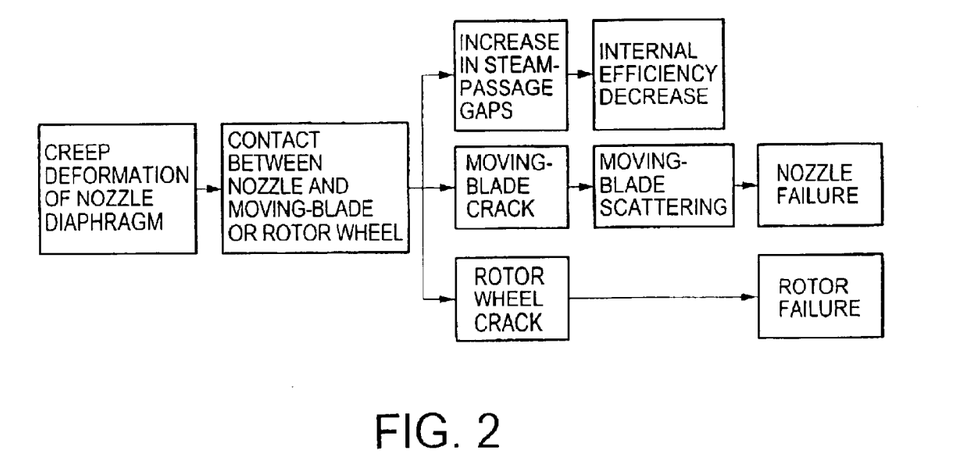
FIG. 2 shows a block diagram indicating failure-event tree breakdown in the first embodiment according to the present invention.

A steam-turbine nozzle diaphragm could suffer from creep deformation due to steam-pressure differences and hence fall down behind (toward downstream side) and finally touch a rotor or moving-blades, thus being damaged. In detail, several failure events can be expected from, for example, the amount of deformation of the nozzle diaphragm as inspection information. Those expected failure events are as follows. The nozzle contacts to the rotor or the moving-blades due to deformation of the nozzle diaphragm. This result in widening of the steam-passage gaps, such as gaps between the tips of the moving-blade and the opposing member. This results in increase in leakage-loss and thus reduction in internal efficiency. The contact of the nozzle with the moving-blades or the rotor wheel also causes cracks in the moving-blades or the rotor due to rubbing or vibration. This results in scattering of cracked portions of the moving-blades, and due to this, the nozzle is broken. The contact of the nozzle with the moving-blades or the rotor wheel also causes cracks in the rotor wheel and failure of the rotor wheel. The FETB unit 2 constructs a failure-event tree indicating causal sequences, such as shown in FIG. 2, based on data stored in a failure-event tree database 7 on the basis of targets and ranges to be maintained, an operation history, an inspection history, etc.

Figure 3:
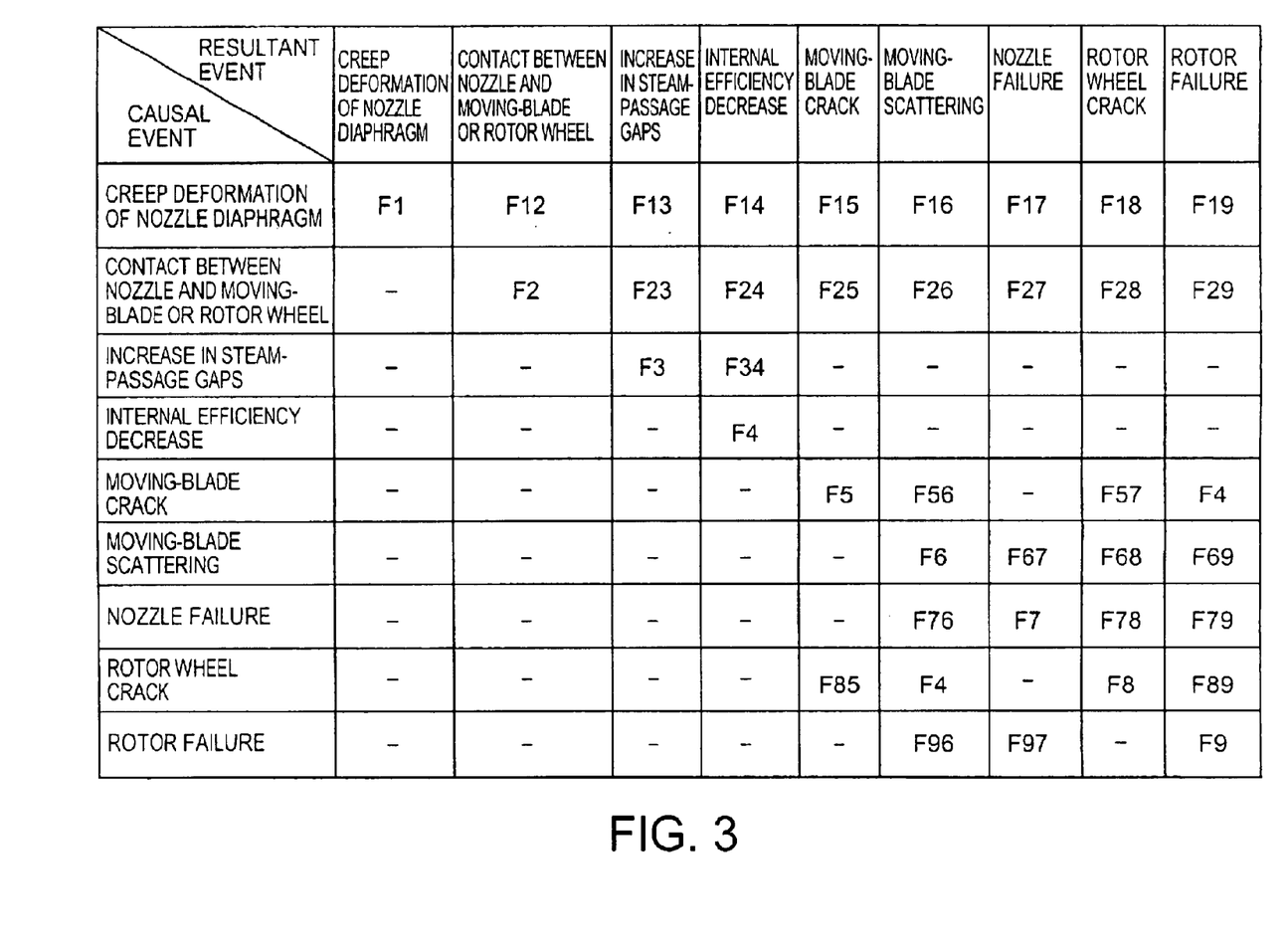
FIG. 3 shows a matrix indicating a failure-unreliability function database in the first embodiment according to the present invention.

The FUFC unit 3 extracts the causal sequences from the FETB unit 2 to construct an interrelated matrix, such as shown in FIG. 3, and gives the matrix items unreliability $F(t)=1-R(t)$ in which $R(t)$ indicates reliability.

The unreliability $F(t)$ shows the rate of failures occurring up to a given time "t", which can be calculated by using the cumulative hazard function, as follows:

The reliability $R(t)$ having the relationship $F(t)=1-R(t)$ with the unreliability $F(t)$ has the following relationship with the cumulative hazard function $H(t)$.

$$R(t)=\exp(-H(t)) \quad \text{(Expression 1)}$$

The cumulative hazard function is obtained by accumulation of failure function $\lambda(\chi)$, indicating failure probability per unit of time from time "0" to time "t" and expressed as follows:

$$H(t) = \int_0^t \lambda(x)\,dx \quad \text{(Expression 2)}$$

An assessed value $H'(t)$ is then given for the cumulative hazard function, as follows:

An assessed value $H'(t)$ of the cumulative hazard function $H(t)$ at time $t_k$ is given by the following expression (3) for the "n" number of observed values $t1 \leq t2 \ldots \leq tn$ $$H'(t)=\Sigma 1/(n+1-i) \quad (3)$$

where "i" is "1" to "k".

It is expressed as $H(t)=(t/\eta)^m$ ("$\eta$" and "m" being constants) when the Weibull cumulative hazard function $H(t)$ is used.

Figure 4:
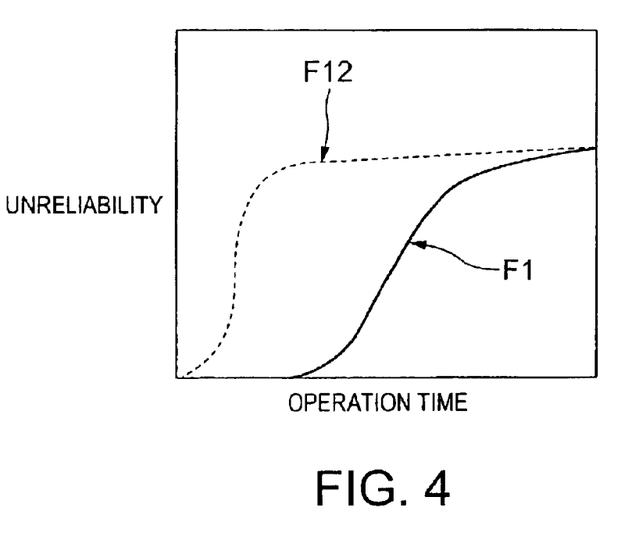
FIG. 4 illustrates unreliability functions in the first embodiment according to the present invention.
Figure 5:
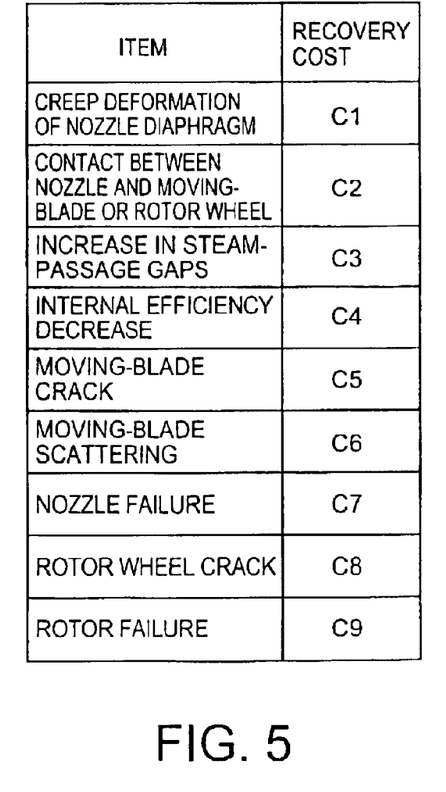
FIG. 5 shows a list of recovery cost in the first embodiment according to the present invention.

Accordingly, the unreliability $F(t)$ is given from the reliability $R(t)$ that is given by the expression (1), using the assessed value $H'(t)$ of the cumulative hazard function. Illustrated in FIG. 4 is the unreliability $F(t)$ that becomes higher as the operation time elapses. As discussed, the unreliability F12, F13, . . . are calculated for the matrix items in the interrelated matrix shown in FIG. 3, and are assigned to the corresponding resultant events.

In the failure-event breakdown process, anterior-event reliabilities are allocated on the diagonal line in FIG. 3, with the unreliability calculated from the operation startup. Events occurring after a particular event are assigned to the items shown in FIG. 3, with calculated posterior-event unreliability.

FIG. 4 teaches that the posterior-event unreliability rapidly increases as indicated by a dot line compared to the anterior-event unreliability indicated by a solid line.

Then, the FDMLC unit 4 calculates the total risk cost Cr with the following expression using unreliability Fij and a recovery cost Ci (failure-derived monetary loss) pre-assigned to each event.

$$Cr=\Sigma(\ldots Fhi\cdot Fij)Ci$$

Posterior probability can be employed as the unreliability Fij. This requires multiplication of the posterior probability by unreliability of an event occurring before the event in question. Alternatively, unreliability combined with unreliability of an event occurring before the event in question may be assigned to each item in FIG. 3.

Figure 6:
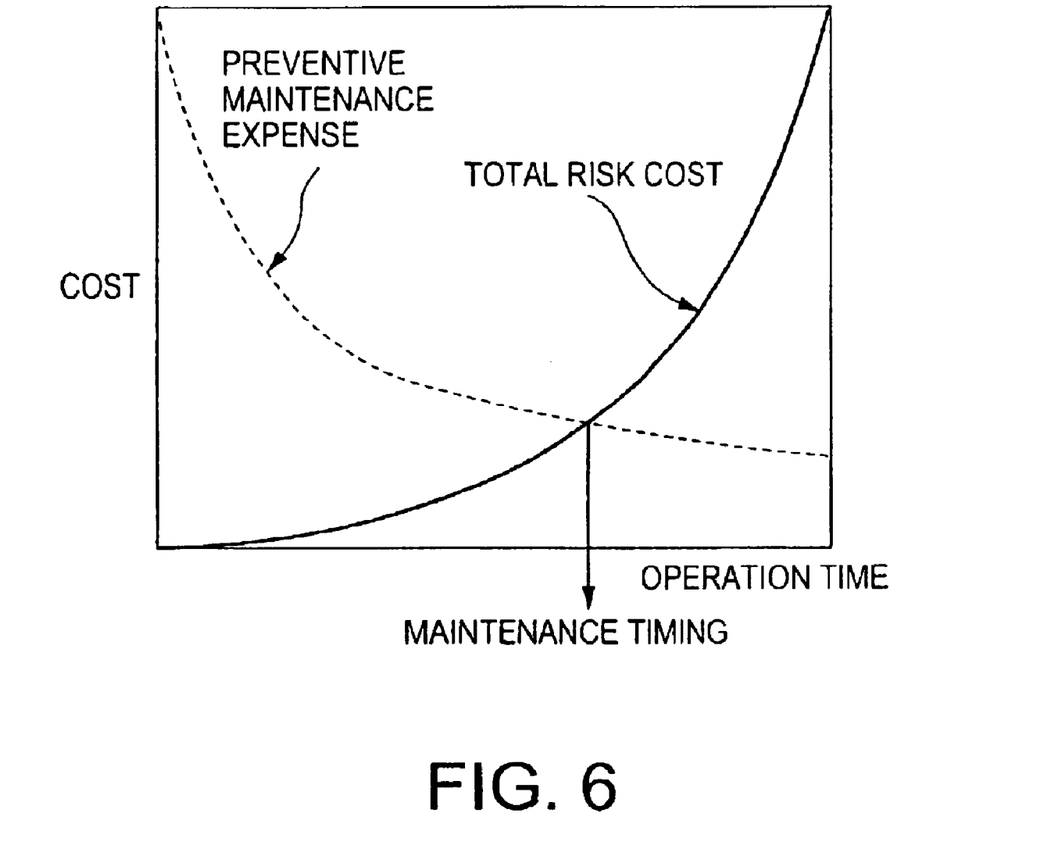
FIG. 6 illustrates comparison between a recovery-cost function and a preventive-maintenance expense function.

The PMEC unit 5 calculates preventive maintenance expenses, as indicated by a dot line in FIG. 6, with addition of depreciation and several maintenance fees to preventive maintenance expenses. The preventive maintenance expenses are sent to the MDM unit 6 and expressed as a time-based function and compared with a function of the total risk cost Cr calculated by the FDMLC unit 4. It is then decided to perform maintenance when the former function is lower than the latter function.

The breakdown order of the items (i.e., events) in the failure-event tree and the unreliability are adjusted by the FETB and FUFC units 2 and 3 in accordance the contents of the plant to be maintained and occurrence of plant failures stored in the failure-event tree database 7 and also a failure-unreliability function database 8 shown in FIG. 1.

In addition to the inspection histories (failure histories), an original form of the failure-event tree is stored beforehand in the failure-event tree database 7. The original form of the failure-event tree is made by expert engineers of the plant engineering by analyzing inspection histories and failure-events of plants similar to the plant to be maintained and by examining the correlation between the failure-events based on their technical experience. When the failure-event tree database 7 receives new inspection data on the plant to be maintained and/or on other similar plants, the FUFC unit 3 re-calculates the unreliability between the failure events. The FETB 2 unit modifies the original form of the failure-event tree (or the failure-event tree having been previously modified) stored in the failure-event tree database 7 on the basis of the re-calculation of the unreliability, in other words, the FETB unit 2 performs re-breakdown of the failure-event tree. In detail, in the event that the unreliability of "nozzle failure" with respect to "moving-blade crack" becomes higher than the unreliability of "moving-blade scattering" with respect to "moving-blade crack" as a result of the renewal of the data stored in the failure-event tree database 7, the FETB unit 2 reverses the order of "nozzle failure" and "moving-blade scattering" in the failure-event tree shown in FIG. 2. In addition, in the event that "nozzle failure" is occurred after the occurrence of "nozzle diaphragm creep deformation" without occurring "contact between nozzle and moving-blade or rotor wheel", "moving-blade crack", and "moving-blade scattering", the FETB unit 2 makes a new branch directly connecting "nozzle diaphragm creep deformation" to "nozzle failure" in the failure-event tree shown in FIG. 2.

As mentioned above, risks are expressed as costs against any failure events that could happen to plant component parts and compared with the preventive maintenance expenses, thus the first embodiment offering a lowest-cost maintenance technique with the lowest risk possibility.

Moreover, breakdown of the failure-event tree in accordance with data on equipment parts and events entered based on the failure-event tree database constructed based on plant equipment and plant operation and inspection histories, and also unreliability calculation based on failure functions between failure events in the broken-down tree can cover all items to be subjected to risk calculation and offer reliability evaluation that matches the actual plant conditions.

Furthermore, adjustments of the breakdown order of the items (i.e., failure events) in the failure-event tree and the adjustments of the unreliability, which are performed by the FETB and FUFC units 2 and 3 in accordance with the entry of data on the plant component parts and plant operation and inspection histories, offer further accurate risk evaluation according to the stored data.

The unreliability may be given to any events depending on the number of start-up by using the cumulative hazard function from the number of start-up at different operating times.

Figure 7:
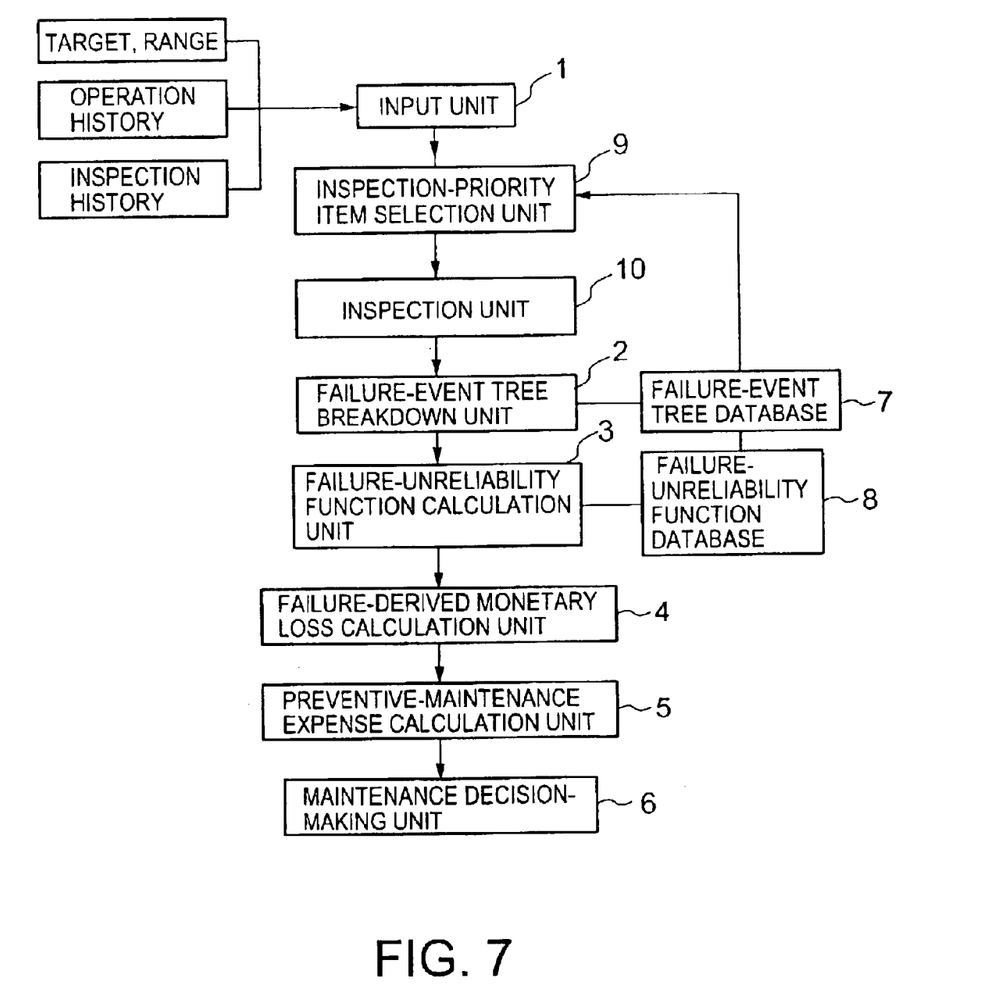
FIG. 7 shows a block diagram of a second embodiment according to the present invention.

FIG. 7 shows a block diagram of the second embodiment of the maintenance apparatus according to the present invention. Elements shown in FIG. 7 the same as or analogous to elements shown in FIG. 1 are referenced by the same numerals.

With this embodiment, the apparatus further provided with an inspection-priority item selection (IPIS) unit 9 configured to select an inspection item. Preferably, the IPIS unit 9 selects an inspection item that can be inspected without disassembling the equipment (e.g., turbine) based on data on targets and ranges to be maintained entered via the input unit 1. In this embodiment, the IPIS unit 9 selects the erosion of the first-stage nozzle blade as the inspection item, which is the summit event in the failure-event tree.

Figure 8:
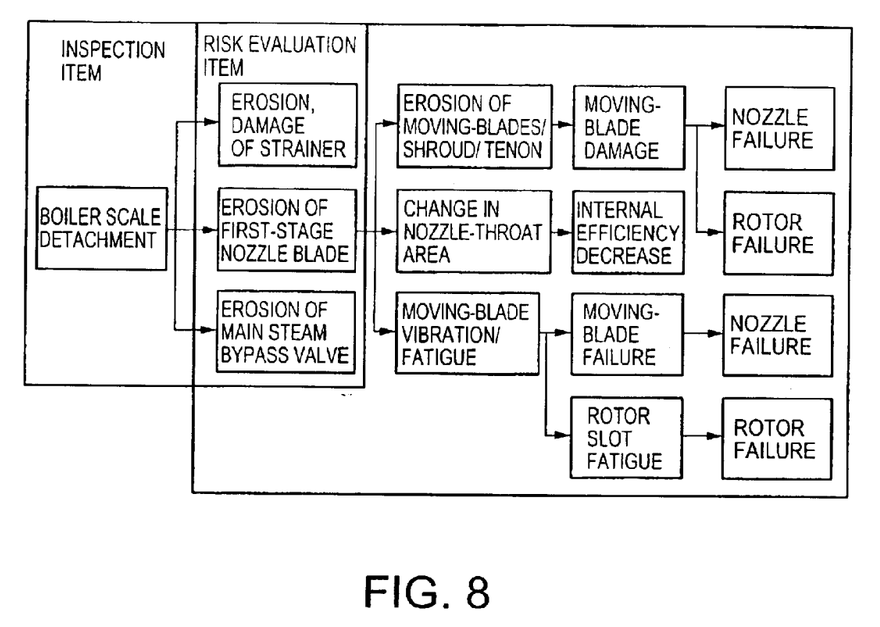
FIG. 8 shows a block diagram indicating failure-event tree breakdown in the second embodiment according to the present invention.

As shown in the failure-event tree of FIG. 8 in which the nozzle-blade erosion is the summit event, a strainer or other parts such as valves located upstream of the first-stage nozzle erode when the first-stage nozzle blade erodes (with a little time difference). The advancement of nozzle-blade erosion leads to change in area of the nozzle throat that causes change in steam flow, thus resulting in reduction in the internal efficiency. This induces fatigue due to erosion of moving-blades, shrouds and tenons or vibration of the moving-blades, thus causing breakage of the moving-blades located downstream of the nozzle, and then the rotor. These breakages lead to breakage to the first-stage nozzle.

Figure 9:
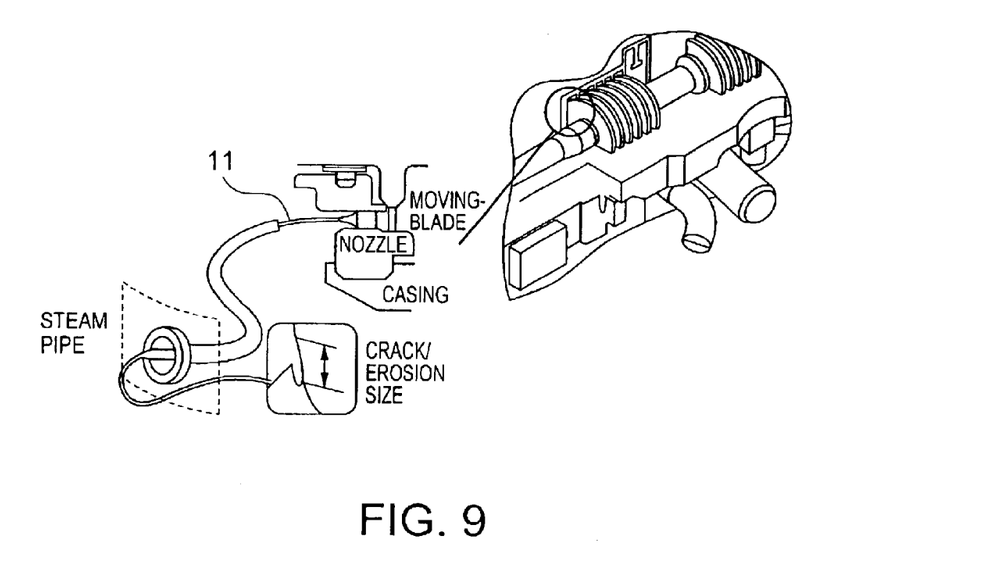
FIG. 9 illustrates a nozzle-erosion inspection unit in the second embodiment according to the present invention.

As shown in FIG. 9, the second embodiment employs a nozzle-erosion inspection unit 10 that is a remote image-processing unit 11 equipped with a CCD-built-in fiber scope and an optical guide. The fiber scope is inserted into the steam pipe to take pictures of the first-stage nozzle blade for image processing in erosion measurements. The image taken by the fiber scope to be processed may be a still image or a moving image.

Like the first embodiment, the FETB unit 2 constructs a failure-event tree indicating causal sequences, such as shown in FIG. 8, based on data stored in the failure-event tree database 7 in accordance with targets and ranges to be maintained, an operation history, an inspection history, etc.

Figure 10:
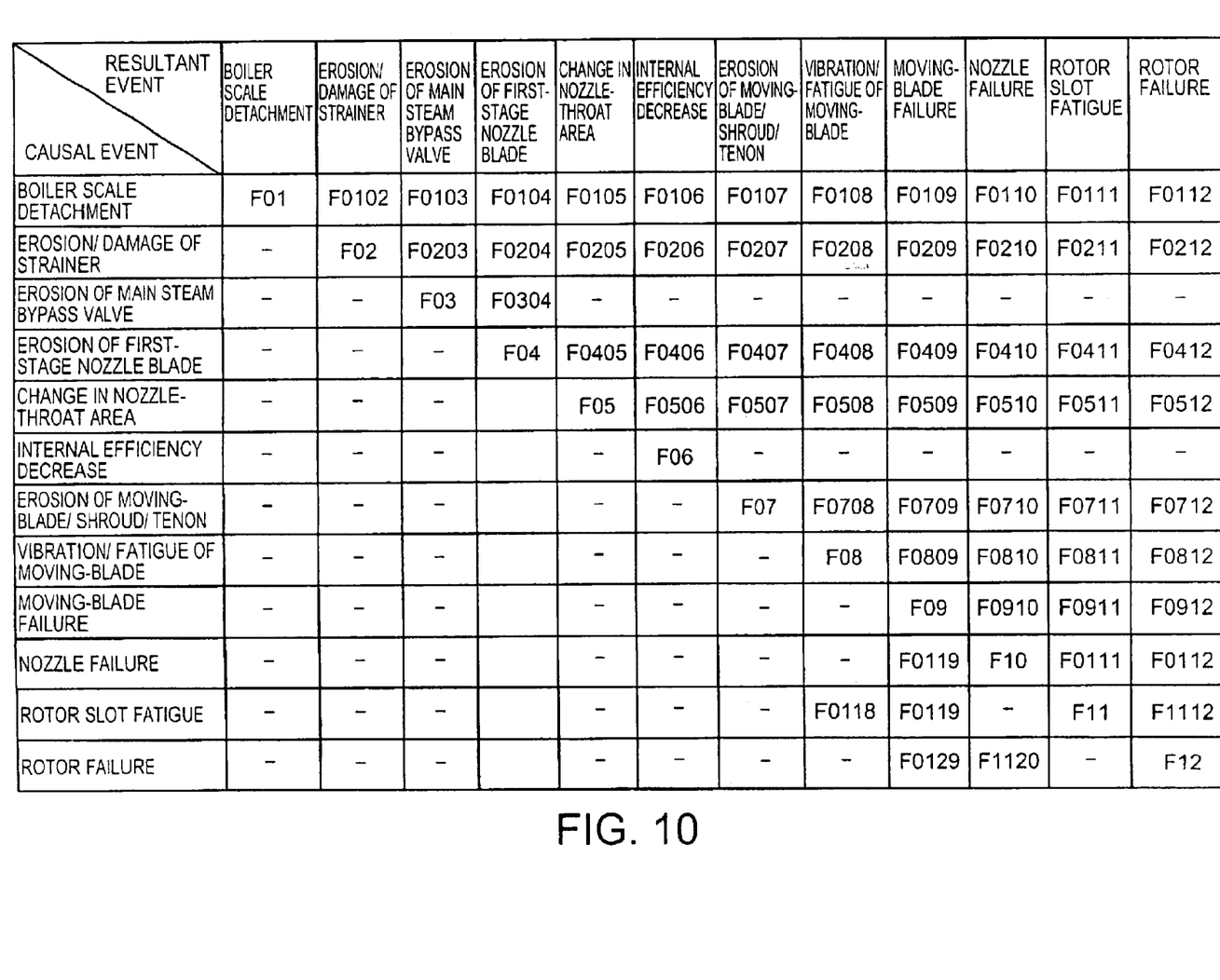
FIG. 10 shows a matrix indicating a failure-unreliability function database in the second embodiment according to the present invention.

The FUFC unit 3 extracts the causal sequences from the FETB unit 2 to construct an interrelated matrix, such as shown in FIG. 10, and gives the matrix items unreliability $F(t)=1-R(t)$ in which $R(t)$ indicates reliability.

Change in amount of erosion is expressed as time-based function from the detachment of boiler-scale or incrustation. It is, however, difficult to predict when the boiler-scale detaches. Thus, it is statistically decide when the amount of erosion becomes constant, with tendency analysis of inspected data, which is then used for unreliability calculation.

Figure 11:
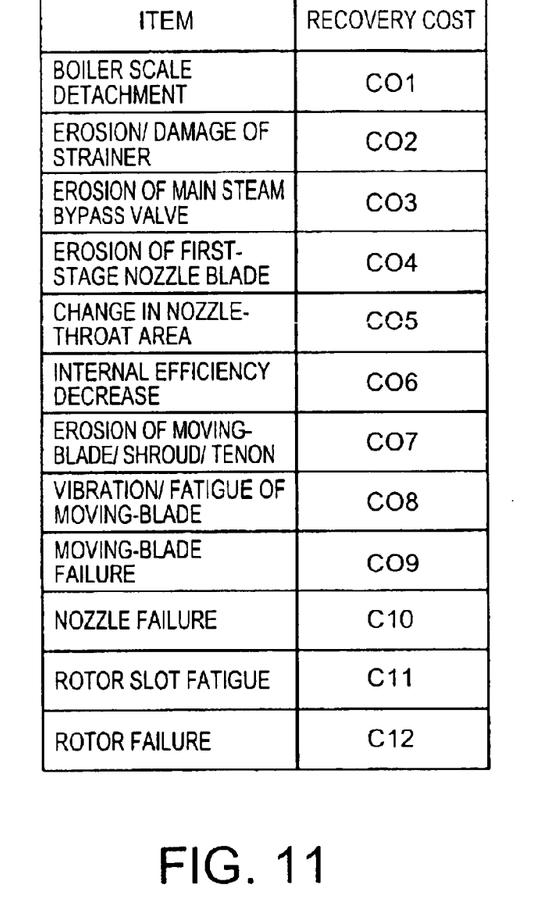
FIG. 11 shows a list of recovery cost in the second embodiment according to the present invention.

Then, the FDMLC unit 4 calculates the accumulated total risk cost $Cr$ using unreliability $Fij$ and a recovery cost $Ci$ pre-assigned to each event, as shown in FIG. 11. The PMEC unit 5 calculates the total preventive maintenance expenses.

Like the first embodiment, depreciation and several maintenance fees are added to the preventive maintenance expenses. The expenses are sent to the MDM unit 6 and expressed as a time-based function and compared with a function of the total risk cost $Cr$ calculated by the FDMLC unit 4. It is then decided to perform maintenance when the former function is lower than the latter function.

Figure 12:
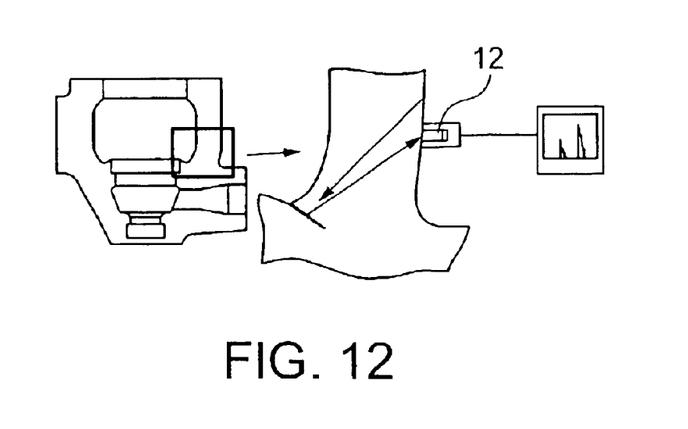
FIG. 12 illustrates measurements of cracks caused in valves.

Illustrated in FIG. 12 is inspection of cracks caused in valves with an ultrasonic inspection sensor 12. The failure-event tree breakdown, failure-unreliability calculation and cost evaluation disclosed above can be applied to these cracks.

As disclosed in detail, risks can be accurately assessed with the minimum number of inspection items gained for the least plant-halt period without equipment disassembly, thus the second embodiment offering a maintenance method at the lowest inspection and diagnosis costs.

Moreover, inspection of internal damage to plant equipment with the CCD camera or the ultrasonic inspection sensor (the images being sent as numerical data to an image processor) quickly offers inspection results on the inspection-priority items in the failure-event tree breakdown.

Figure 13:
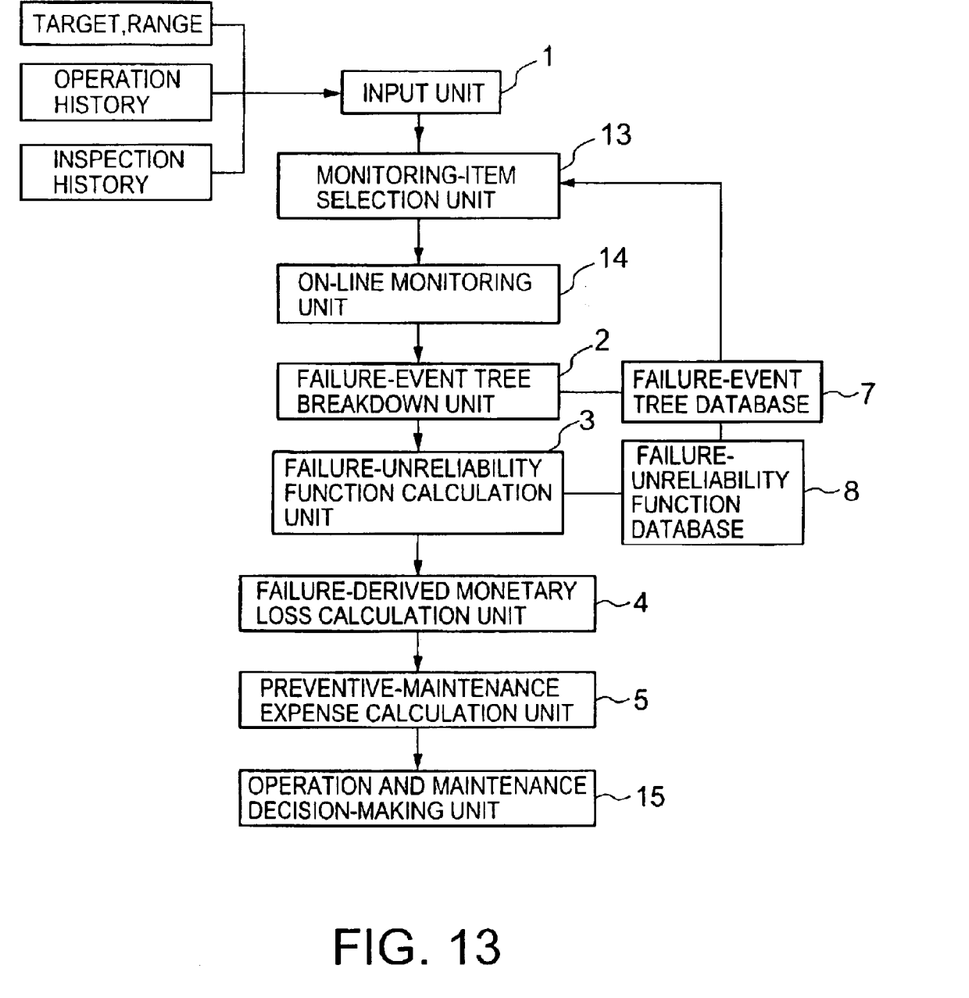
FIG. 13 shows a block diagram of a third embodiment according to the present invention.

FIG. 13 shows a block diagram of the third embodiment of the maintenance apparatus according to the present invention. Elements shown in FIG. 13 the same as or analogous to elements shown in FIG. 1 are referenced by the same numerals.

With this embodiment, the maintenance apparatus further provided with a monitoring-item selection (MIS) unit 13 configured to select a monitoring item (i.e., an item to be monitored). Preferably, the MIS unit 13 selects a monitoring item that can be monitored without halting the operation of the plant based on data on targets and ranges to be maintained entered via the input unit 1. In this embodiment, the MIS unit 13 select the vibration of a turbine shaft as the monitoring item, which is an intermediate, resultant failure event expected from the summit event in the failure event tree.

If summit failure event is erosion of the steam-turbine nozzle blades, it is impossible to directly monitor the summit event, namely the condition of the nozzle blades, while the plant is operating. Thus, in this embodiment, vibration of the turbine shaft is monitored instead of the erosion of the nozzle blades. Abnormal vibration of the turbine shaft, due to change in steam flow caused by advancement of the nozzle erosion or the contact of the nozzle blades to the moving-blades, can be monitored by using a vibration sensor, without halting the operation of the plant.

Monitoring item may be at least one of fluid pressure, temperature, rotation speed, load, vacuum, in-fluid impurity concentration, cooling speed and time, deformation, displacement, decrease in wall thickness, fluid-level height and vibration, which can be monitored without halting the operation of the plant. In order to monitor the above items, the maintenance apparatus is provided with an on-line monitoring unit 14. The on-line monitoring unit 14 can utilize any sensors that detect electric signals, ultrasonic wave or acoustic emission, for monitoring the above factors while the plant is operating.

Figure 14:
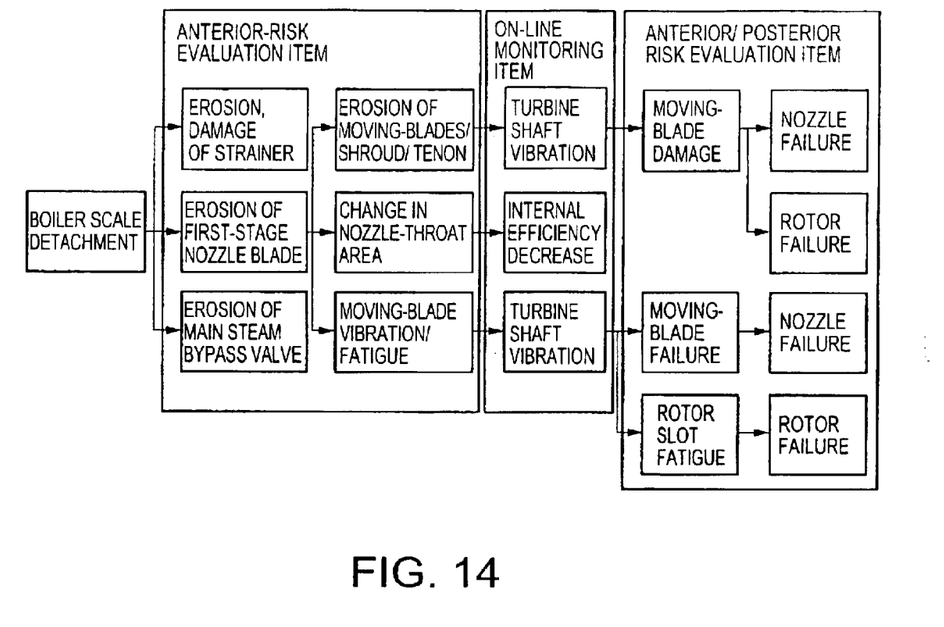
FIG. 14 shows a block diagram indicating failure-event tree breakdown in the third embodiment according to the present invention.
Figure 15:
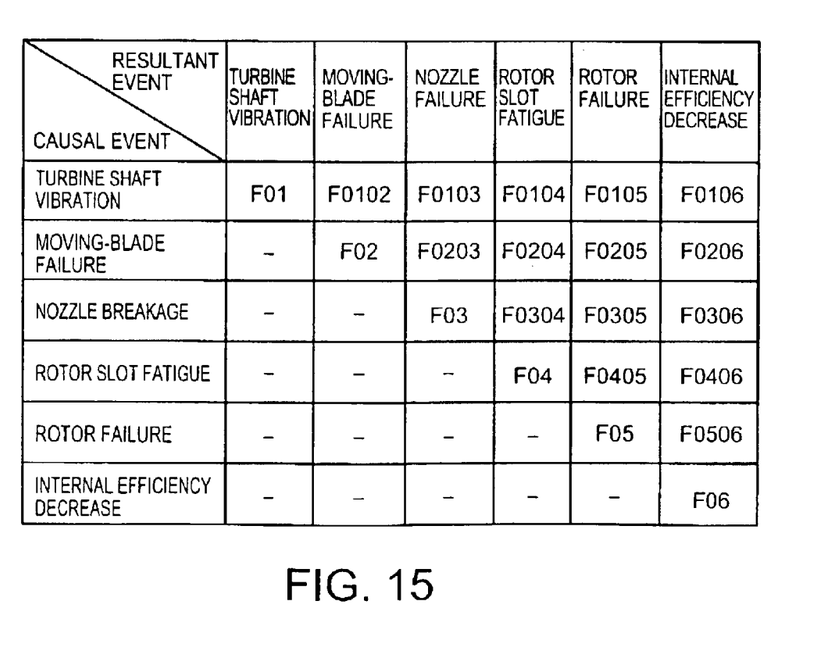
FIG. 15 shows a matrix indicating a failure-unreliability function database in the third embodiment according to the present invention.

Shown in FIG. 14 is a failure-event tree for on-line vibration monitoring. FIG. 15 shows an interrelated matrix stored in the failure-unreliability function database 8. Like the first and second embodiments, the failure-event tree and data stored in the failure-unreliability function database 8 are used for calculation of risk-based recovery and preventive maintenance expenses. The risk-based recovery cost and the preventive maintenance expenses are compared with each other by an operation and maintenance decision-making (OMDM) unit 15. Then, the OMDM unit 15 determines a time period for which an operation at the time of maintenance decision can be continued and also inspection timing and preventive maintenance.

As disclosed above, the third embodiment achieves on-line determination of real-time risk-based operation and maintenance while monitoring inspection-priority items in the failure-event tree without halting the plant.

Moreover, the third embodiment employs the on-line monitoring unit for remote abnormal-signal monitoring to at least one of several factors, such as, in-plant fluid pressure, temperature, rotation speed, load, vacuum, in-fluid impurity density, cooling speed and time, deformation, displacement, decrease in wall thickness, fluid-level height and vibration. The on-line monitoring unit can accurately monitor the abnormality of any items required for causal events or intermediate events in the failure-event tree breakdown. Furthermore, the third embodiment employs any sensors using electric signals, ultrasonic waves or acoustic emission, for monitoring those factors while the plant is operating, thus accurately monitoring any signs of and the timing of the summit event in the failure-event tree breakdown.

Figure 16:
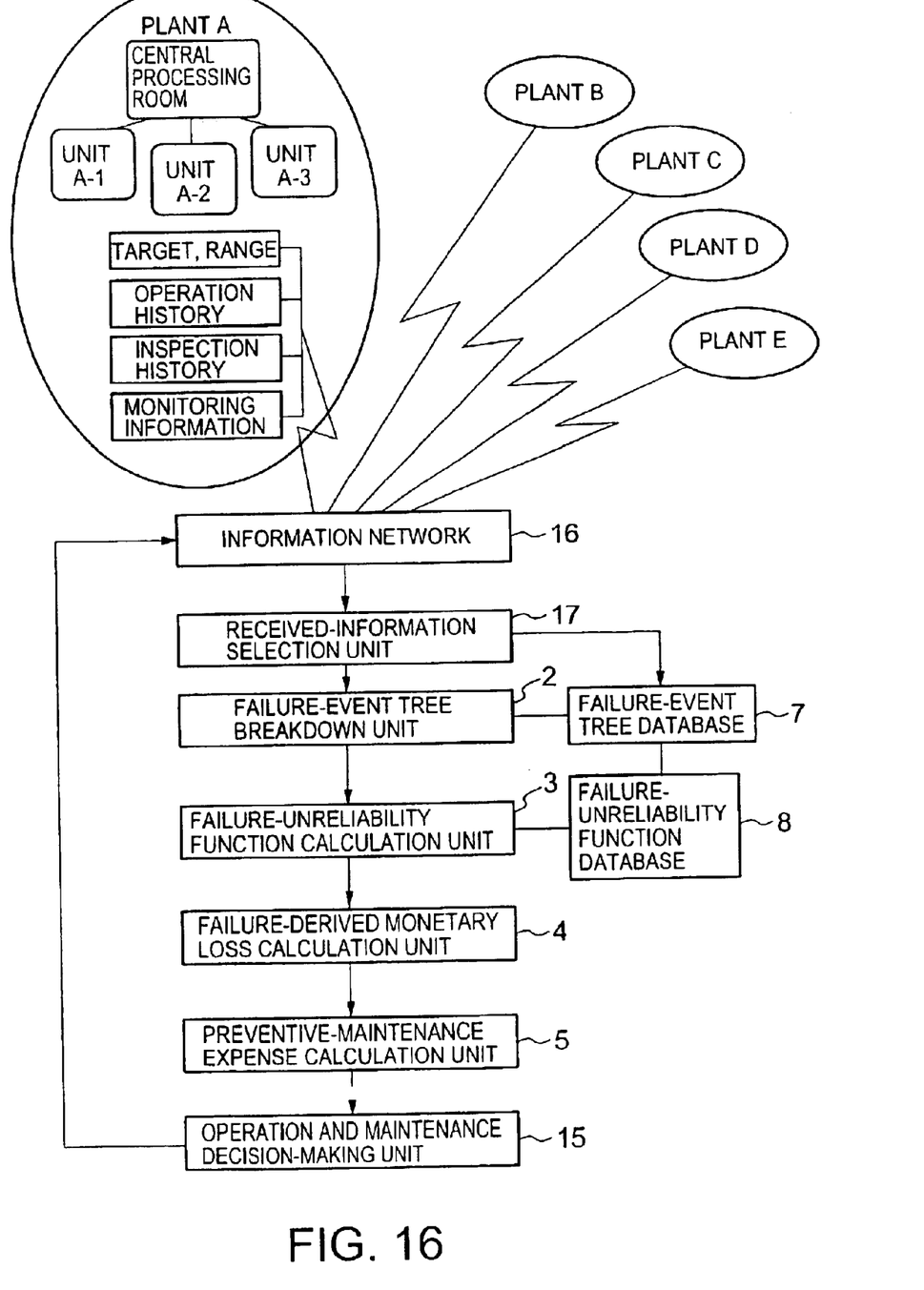
FIG. 16 shows a block diagram of a fourth embodiment according to the present invention.

FIG. 16 shows a block diagram of the fourth embodiment of the maintenance apparatus according to the present invention. Elements shown in FIG. 16 the same as or analogous to elements shown in FIG. 1 are referenced by the same numerals. The fourth embodiment employs an information network 16 connected to a communications network between the plant-maintenance apparatus according to the present invention and several plants B, C, D and E, and also a supervisor plant A that can transmit data on unit-inspection, -operation and -monitoring and receive results of diagnosis and maintenance determination.

The signals received via the information network 16 are sent to a received-information selection (RIS) unit 17 for selecting input information among information for diagnosis and determination. The selected information are stored in the failure-event tree database 7 and also the failure-unreliability function database 8, for updating to data on failure-event tree breakdown and unreliability. Failure-event tree breakdown and failure unreliability function calculation are performed based on the updated data. After the same procedure as in the third embodiment, determined information on whether to continue plant operations and inspection timing given at the OMDM unit 15 are returned to the supervisor plant A.

As disclosed above, the fourth embodiment performs batch processing to information from several plants, thus can collect a lot of field data to be used for decision of the failure-event tree breakdown and failure unreliability function, for further accurate diagnosis and determination. Moreover, the on-line monitoring unit offers information on determinations and instructions based on real-time data, thus contributing to steady plant operations.

As disclosed above in detail, the present invention offers quantitative risk evaluation different from known experimental qualitative decision making, thus achieving risk management covering any failure events to plant equipment and the minimum maintenance cost. Moreover, the present invention offers risk evaluation with the minimum number of inspection items or through on-line monitoring without a halt to plant operations, at the minimum inspection cost. Furthermore, the present invention allows reference to information on several plants via network, thus achieving further accurate evaluation with extended field data. Therefore, the present invention achieves maintenance at minimum risk and cost.

What is claimed is:

1. An apparatus for maintaining plant equipment comprising:

an input it configured to receive information on targets and ranges of plant equipment to be maintained, that constitute a plant, inspection information and operation-history information;

a failure-event tree breakdown unit configured to perform tree-breakdown on failures to be expected from a failure event to be inspected, in order to obtain a failure-event tree;

a failure-unreliability function calculation unit configured to calculate unreliability of a resultant event in the failure-event tree with respect to a causal event in the failure-event tree preceding the resultant event;

a failure-derived monetary loss calculation unit configured to multiply each unreliability and a cost of recovery from each event and accumulate results of multiplication in accordance with the failure-event tree breakdown, thus obtaining a recovery cost;

a preventive-maintenance expense calculation unit configured to calculate preventive maintenance expenses for preventing failure events; and a maintenance decision-making unit configured to decide maintenance timing and technique through comparison between the recovery cost and the preventive maintenance expenses.

2. The apparatus for maintaining plant equipment according to claim 1, wherein:

the failure-event tree breakdown unit has a failure-event tree database constructed based on inspection histories and operation histories for the plant to be maintained and other plants; and the failure-event tree breakdown unit is configured to perform the tree-breakdown from a specific failure-event of a specific part of the plant to be maintained inputted by an input unit, while referring to contents of the database.

3. The apparatus for maintaining plant equipment according to claim 1, wherein:

the failure-unreliability function calculation unit has a failure-unreliability function database constructed based on inspection histories and operation histories for the plant to be maintained and other plants; and the failure unreliability function calculation unit is configured to calculate the unreliability while referring to the database based on failure-unreliability function between the resultant even and the causal event in the failure-event tree in accordance with information on parts of the plant and events inputted via the input unit.

4. The apparatus for maintaining plant equipment according to claim 1, wherein the failure-event tree breakdown unit and the failure-unreliability function calculation unit adjust the order of the failure events in the failure-event tree and failure-unreliability function.

5. The apparatus for maintaining plant equipment according to claim 1, wherein the unreliability of the plant equipment is given using cumulative hazard function based on an operation time at which each failure event occurs.

6. An apparatus for maintaining plant equipment comprising:
   an input it configured to receive information on targets and ranges of plant equipment to be maintained, that constitute a plant, inspection information and operation-history information;
   an inspection-priority item selection unit configured to select a failure event as a priority item to be inspected which is stored in a failure event tree database;
   an inspection unit configured to inspect the selected failure event;
   a failure-event tree breakdown unit configured to perform tree-breakdown on failures to be expected from the failure event to be inspected, in order to obtain a failure-event tree;
   a failure-unreliability function calculation unit configured to calculate unreliability of a resultant event in the failure-event tree with respect to a causal event in the failure-event tree preceding the resultant event;
   a failure-derived monetary loss calculation unit configured to multiply each unreliability and a cost of recovery from each resultant event and accumulate results of multiplication in accordance with the failure-event tree breakdown, thus obtaining a recovery cost;
   a preventive-maintenance expense calculation unit configured to calculate preventive maintenance expenses for preventing failure events; and
   a maintenance decision-making unit configured to decide maintenance timing and technique through comparison between the recovery cost and the preventive maintenance expenses.

7. The apparatus for maintaining plant equipment according to claim 6, wherein:
   the failure-event tree breakdown unit has a failure-event tree database constructed based on inspection histories and operation histories for the plant to be maintained and other plants; and
   the failure-event tree breakdown unit is configured to perform the tree-breakdown from a specific failure-event of a specific part of the plant to be maintained inputted by an input unit, while referring to contents of the database.

8. The apparatus for maintaining plant equipment according to claim 6, wherein:
   the failure-unreliability function calculation unit has a failure-unreliability function database constructed based on inspection histories and operation histories for the plant to be maintained and other plants; and
   the failure-unreliability function calculation unit is configured to calculate the unreliability while referring to the database based on failure-unreliability function between the resultant event and the causal event in the failure-event tree in accordance with information on part of the plant and events inputted via the input unit.

9. The apparatus for maintaining plant equipment according to claim 6, wherein the failure-event tree breakdown unit and the failure-unreliability function calculation unit adjust the order of the failure events in the failure-event tree and failure-unreliability function.

10. The apparatus for maintaining plant equipment according to claim 6, wherein the unreliability of the plant equipment is given using cumulative hazard function based on an operation time at which each failure event occurs.

11. The apparatus for maintaining plant equipment according to claim 6, wherein the inspection unit comprises a CCD camera capable of accessing to a part to be inspected without disassembling a plant equipment in order to take a still image or a moving image, and a image analysis device configured to analyze a image data sent from the CCD camera.

12. The apparatus for maintaining plant equipment according to claim 6, the inspection unit comprises an ultrasonic inspection device capable of detect a crack formed in a plant equipment from an outer surface thereof without disassembling the plant equipment.

13. An apparatus for maintaining plant equipment comprising:
   an input unit configured to receive information on targets and ranges of plant equipment to be maintained, that constitute a plant, inspection information and operation-history information;
   a monitoring-item selection unit configured to select a failure event as a priority item to be monitored which is stored in a failure event tree database;
   an on-line monitoring unit configured to monitor the selected failure event;
   a failure-event tree breakdown unit configured to perform tree-breakdown on failures to be expected from the failure event to be inspected, in order to obtain a failure-event tree;
   a failure-unreliability function calculation unit configured to calculate unreliability of a resultant event in the failure-event tree with respect to a causal event in the failure-event tree preceding the resultant event;
   a failure-derived monetary loss calculation unit configured to multiply each unreliability and a cost of recovery from each event and accumulate results of multiplication in accordance with the failure-event tree breakdown, thus obtaining a recovery cost;
   a preventive-maintenance expense calculation unit configured to calculate preventive maintenance expenses for preventing failure events; and
   a maintenance decision-making unit configured to decide maintenance timing and technique through comparison between the recovery cost and the preventive maintenance expenses.

14. The apparatus for maintaining plant equipment according to claim 13, wherein:
   the failure-event tree breakdown unit has a failure-event tree database constructed based on inspection histories and operation histories for the plant to be maintained and other plants; and
   the failure-event tree breakdown unit is configured to perform the tree-breakdown from a specific failure-event of a specific part of the plant to be maintained inputted by an input unit, while referring to contents of the database.

15. The apparatus for maintaining plant equipment according to claim 13, wherein:

the failure-reliability function calculation unit has a failure-unreliability function database constructed based on inspection histories and operation histories for the plant to be maintained and other plants; and the failure-reliability function calculation unit is configured to calculate the unreliability while referring to the database based on failure-unreliability function between the resultant event and the causal event in the failure-event tree in accordance with information on parts of the plant and events inputted via the input unit.

16. The apparatus for maintaining plant equipment according to claim 13, wherein the failure-event tree breakdown unit and the failure-unreliability function calculation unit adjust the order of the failure events in the failure-event tree and failure-unreliability function.

17. The apparatus for maintaining plant equipment according to claim 13, wherein the unreliability of the plant equipment is given using cumulative hazard function based on an operation time at which each failure event occurs.

18. The apparatus for maintaining plant equipment according to claim 13, wherein the on-line monitoring unit is capable of remote abnormal-signal monitoring to at least one of factor that are in-plant fluid pressure, temperature, rotation speed, load, vacuum, in-fluid impurity density, cooling speed and time, deformation, displacement, decrease in wall thickness, fluid-level height and vibration.

19. The apparatus for maintaining plant equipment according to claim 13, wherein the on-line monitoring unit utilizes electric signals, ultrasonic sound or acoustic emission, or their combination.

20. A method of maintaining plant equipment comprising the steps of:

receiving information on targets and ranges of plant equipment to be maintained, that constitute a plant, inspection information and operation-history information;

performing tree-breakdown on failures to be expected from a failure-event to be inspected, thereby obtaining a failure-event tree;

calculating unreliability of every resultant event in the failure-event tree with respect to corresponding causal event in the failure event tree;

multiplying each unreliability and a cost of recovery from each event to and accumulating results of multiplication in accordance with the failure-event tree breakdown, thereby obtaining a recovery cost;

calculating preventive maintenance expenses for preventing failure events; and deciding maintenance timing and technique through comparison between the recovery cost and the preventive maintenance expenses.

21. A method of maintaining plant equipment comprising the steps of:

receiving information on plant equipment to be maintained, that constitute a plant, inspection information and operation-history information;

selecting failure event as a priority item to be inspected which is stored in a failure event tree database;

inspecting the selected failure event;

performing tree-breakdown on failures to be expected from the failure event to be inspected, thereby obtaining a failure-event tree;

calculating unreliability of every resultant event in the failure-event tree with respect to corresponding causal event in the failure event tree;

multiplying each unreliability and a cost of recovery from each resultant event and accumulating results of multiplication in accordance with the failure-event tree breakdown, thereby obtaining a recovery cost;

calculating preventive maintenance expenses for preventing failure events; and deciding maintenance timing and technique through comparison between the recovery cost and the preventive maintenance expenses.

22. A method of maintaining plant equipment comprising the steps of:

receiving information on targets and ranges of plant equipment to be maintained, that constitute a plant, inspection information and operation-history information;

selecting a failure event as a priority item to be inspected which is stored in a failure event tree database;

monitoring the selected failure event;

performing tree-breakdown on failures to be expected from the failure event to be inspected;

calculating unreliability of each item in the failure-event tree breakdown;

multiplying each unreliability and a cost of recovery from each resultant event and accumulating results of multiplication in accordance with the failure-event tree breakdown, thus obtaining a recovery cost;

calculating preventive maintenance expenses for preventing failure events; and deciding maintenance timing and technique through comparison between the recovery cost and the preventive maintenance expenses.

23. A method of maintaining plant equipment comprising the steps of:

transmitting, over a network, data from inspection and monitoring units for equipment that constitute each of a plurality of plants, each plant having a plurality of units;

processing the transmitted data through failure-event tree breakdown, failure-unreliability function calculation, failure-derived monetary loss calculation, failure-derived monetary loss calculation and preventive-maintenance expense calculation;

storing the processed data in a failure-event tree database and a failure-unreliability function database or learning, for providing the accuracy of failure-unreliability function calculation in maintenance decision making; and transmitting results of maintenance decision making to the plants.

* * * * *